Nov. 11, 1952 N. P. BACH 2,617,461
MUSHROOM DECAPPING, TRIMMING, AND CUTTING MACHINE
Filed April 3, 1951 3 Sheets-Sheet 1

INVENTOR.
NIELS P. BACH
BY George W. Reiber
ATTORNEY

Nov. 11, 1952 — N. P. BACH — 2,617,461
MUSHROOM DECAPPING, TRIMMING, AND CUTTING MACHINE
Filed April 3, 1951 — 3 Sheets-Sheet 2

INVENTOR.
NIELS P. BACH
BY George W. Reiber
ATTORNEY

Nov. 11, 1952 N. P. BACH 2,617,461
MUSHROOM DECAPPING, TRIMMING, AND CUTTING MACHINE
Filed April 3, 1951 3 Sheets-Sheet 3

INVENTOR.
NIELS P. BACH
BY
George W. Reiber
ATTORNEY

Patented Nov. 11, 1952

2,617,461

UNITED STATES PATENT OFFICE 2,617,461

MUSHROOM DECAPPING, TRIMMING, AND CUTTING MACHINE

Niels P. Bach, Clearwater, Fla.; Gerda F. Bach executrix of said Niels P. Bach, deceased Application April 3, 1951, Serial No. 219,045

5 Claims. (Cl. 146—78)

The present invention relates generally to the trimming and cutting of vegetables, and more particularly to capping, trimming and cutting of mushrooms.

Edible mushrooms, well known as table delicacies, require greater care in handling by packers than most food products. The tender caps and stems of mushrooms would be broken or marred and their market value thus decreased if handled by methods ordinarily used in packing the more common vegetables.

Furthermore, consumers have shown a preference to the separate packaging of mushroom caps and stems, and the present invention is particularly well adapted to the decapping, trimming and cutting of mushrooms preparatory to this preferred packaging.

An object of the invention is therefore the provision of apparatus which will gently and automatically locate and hold a mushroom for the operations to be performed upon it without rubbing or abrading the delicate surface of the mushroom.

Another object of the invention is the provision of means for impaling the stem of each mushroom before decapping it so that control of the stem may be maintained after the cap is removed.

A further object of the invention is the provision of means for automatically adjusting the position of the severed stem, which is generally of irregular shape, so that a series of cuts may be made transversely of the stem to produce the best formed longitudinal cuts or pieces to be obtained from each stem.

Another object of the invention is the provision of a friction device engageable with the root end of the stem to locate the stem longitudinally relative to stem engagement with a locator which adjusts the irregular shaped stem to its best position therein preliminary to cutting engagement with the knives.

A still further object of the invention is the provision of means for collecting the caps and stem cuts separately, and for discarding the severed root ends of the mushrooms.

Yet another object of the invention is the provision and arrangement of apparatus which will perform the above mentioned operations at higher speeds and yet without injury to the delicate mushroom caps and stems.

Numerous other objects and advantages of the invention will be apparent as it is better understood from the following description and accompanying drawings which disclose a preferred embodiment of the invention.

Referring to the drawings.

Figure 1:
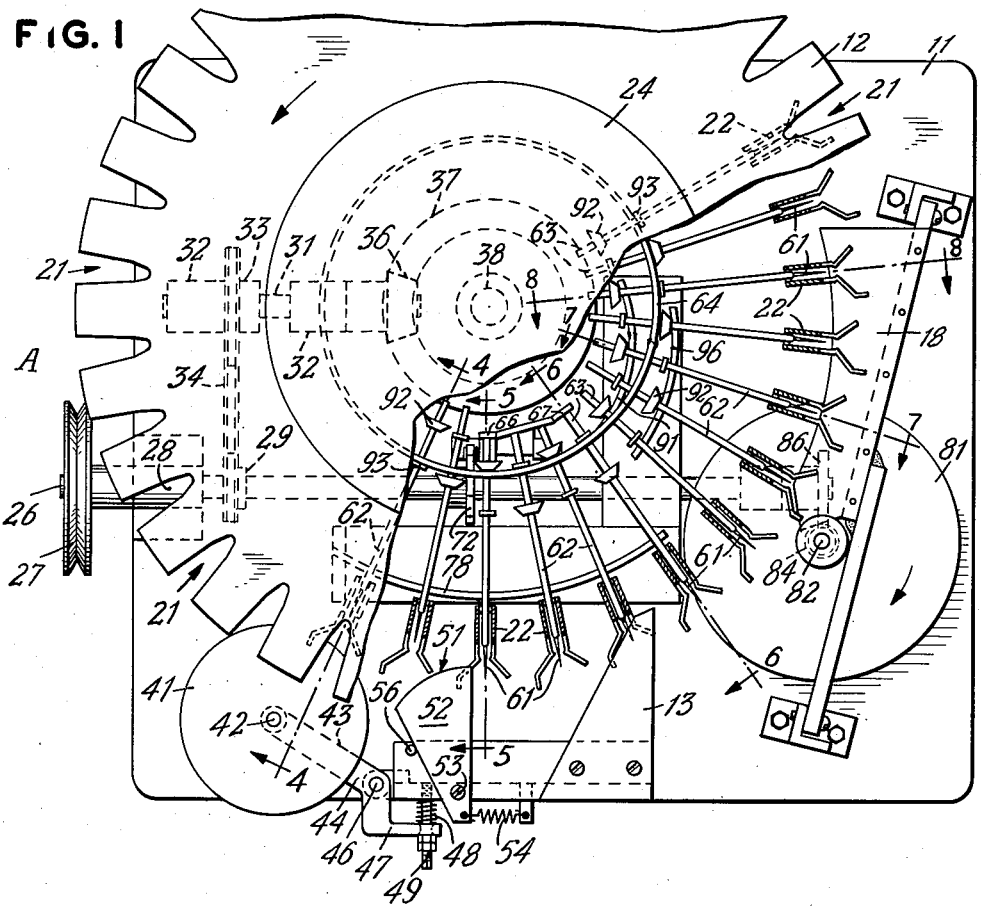
Fig. 1 is a plan view of a machine which is a preferred embodiment of my invention.
Figure 2:
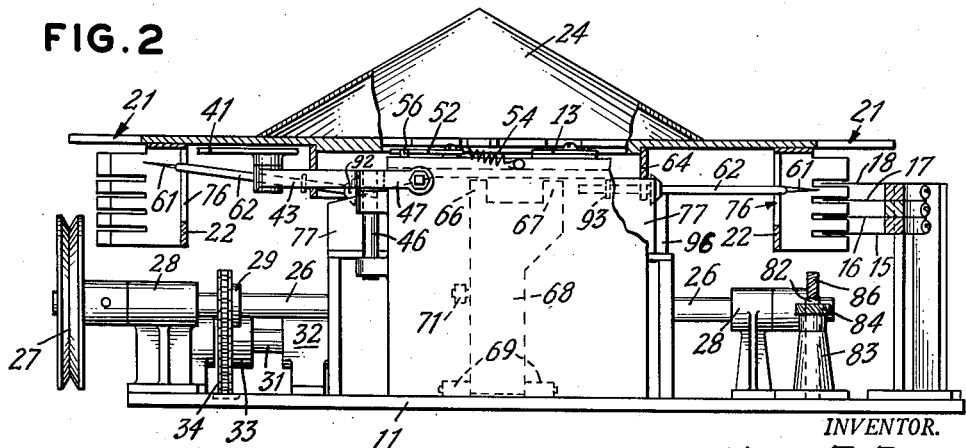
Fig. 2 is a front elevation of the machine with parts broken away to facilitate illustration.

Figs. 4, 5, 6, 7 and 8 are detail vertical sections made to larger scale and taken, respectively, along the lines 4—4, 5—5, 6—6, 7—7 and 8—8 in Fig. 1. These sections illustrate the progressive operations of the machine on a mushroom.

Figure 9:
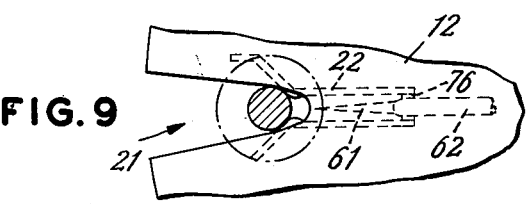

Fig. 9 shows a plan view of a single pocket and locator with a mushroom stem in position therein.

The machine disclosed herein as a preferred embodiment of the invention comprises a base and frame 11 on which is mounted a horizontally disposed rotary turret table 12 for conveying mushrooms through a decapping operation effected by a stationary knife 13 and a stem cutting and root trimming operation effected by a series of vertically spaced and substantially parallel stationary knives 15, 16, 17 and 18. These five stationary knives are mounted on the frame 11.

The turret 12 is formed at its periphery with a series of generally V-shaped open pockets 21. At the inner portion of each pocket 21, a stem locator 22 is supported on the underside of the turret 12 and depends therefrom.

Mushrooms are fed to the centre of the turret table 12 where they fall upon a central conical surface 24 and are thereby spread radially to positions close to the pockets 21. An operator at about position A places each of these mushrooms, stem down, in one of the pockets as the table is rotated.

Rotation of the table is effected by suitable motive power applied through a sheave 27 or like device to rotate a horizontal drive shaft 26. Shaft 26 is mounted in bearings 28 on the frame 11 and carries a sprocket 29 keyed thereto. A short driven shaft 31, journaled in bearings 32 of the frame 11, is keyed to a sprocket 33 and is driven from shaft 26 through a sprocket chain 34 which takes over sprockets 29 and 33. A bevel gear 36, keyed to the inner end of shaft 31 meshes with a second bevel gear 37 formed on the hub of turret 12 which is freely rotatable on a stationary vertical shaft 38 mounted in a bearing 39 of frame 11. Thus power transmitted through the bevel gears 36, 37 rotates the table turret 12. This rotation is in a counterclockwise direction as viewed in Fig. 1.

Figure 4:
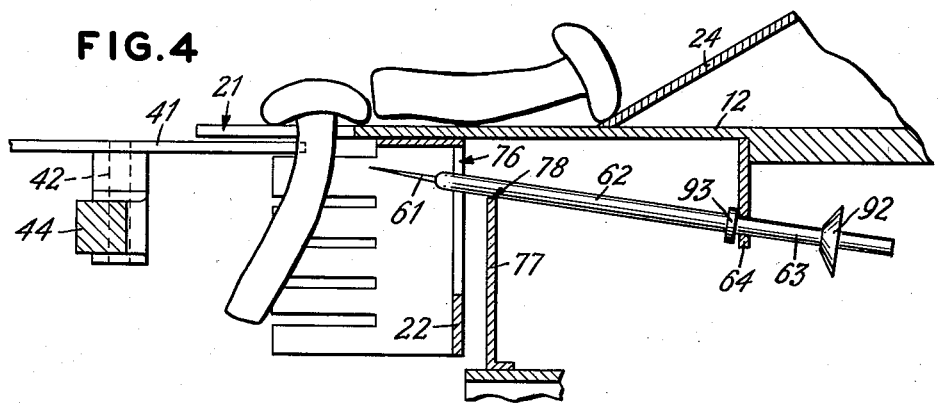
Figure 5:
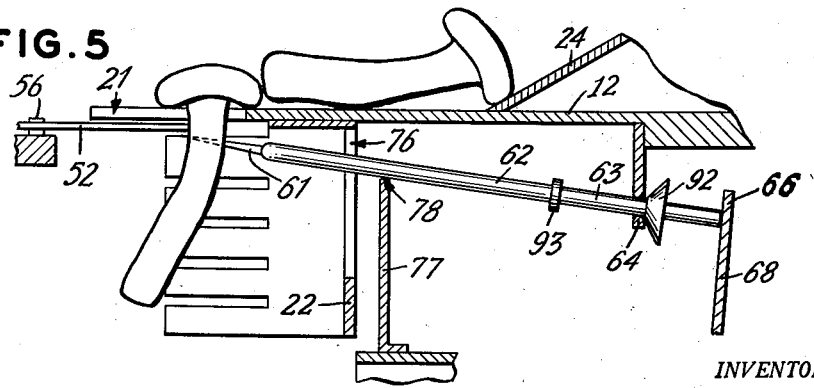
Figure 6:
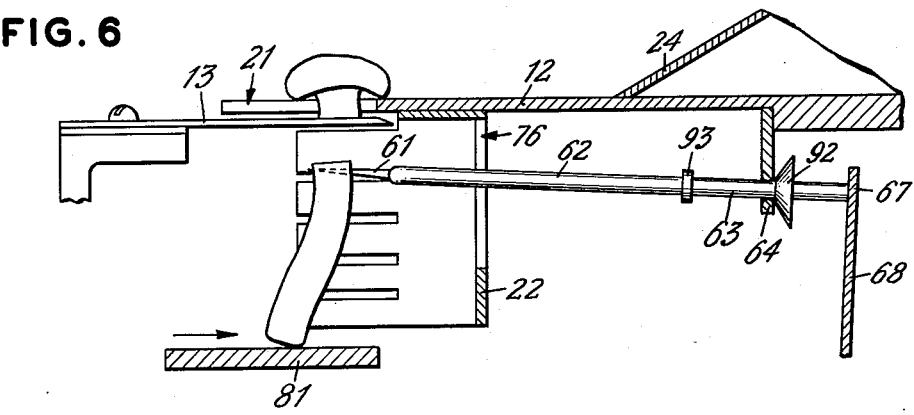
Figure 7:
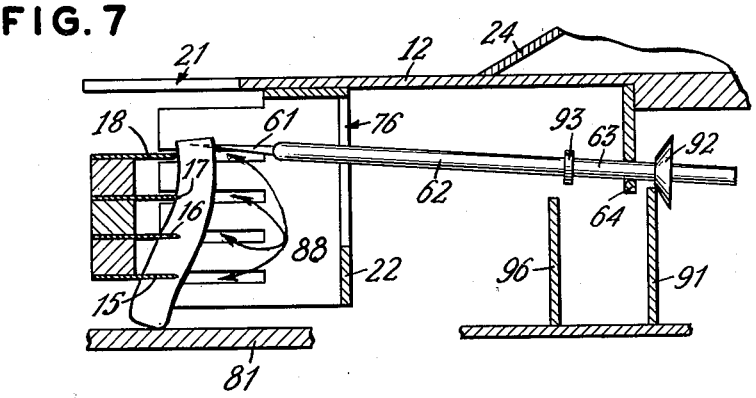

After each mushroom is placed by the operator loosely in a pocket 21, it is moved radially inwardly by engagement with a yieldably mounted, freely rotatable mushroom positioning disc 41 located close to the path of the underside of the turret 12 (Figs. 1 and 4). This disc is rotatably mounted on a pin 42 set in the free end of an arm 43 of a bell crank 44. The bell crank is pivotally mounted at 46 on the frame 11 and the free end of the second arm 47 engages a spring 48 which urges the bell crank to rotate in a clockwise direction as viewed in Fig. 1. An adjustable stop 49 prevents excessive rotation in this direction.

The periphery of the disc 41 thus yieldably engages and moves each mushroom stem into the inner end of its pocket 21 and associated locator 22. During this operation, the disc rotates because the point of contact with the stem remains substantially the same as it follows the stem. Therefore, no harmful rubbing or abrading action can mar the mushroom during this operation.

Further rotation of the turret table carries the stem of the mushroom into engagement with a support face 51 of a plate cam 52 which is pivotally mounted at 53 on the frame 11. The cam is biased to rock in a counterclockwise direction by a spring 54, secured at one end to the plate and at the other to the frame 11, and is prevented from excessive rotation in that direction by a stop pin 56 also set in the frame 11.

The arcuate shape of the support face 51 makes it adaptable to engagement with stems of different diameters and shapes and to restrain them in their locator pockets with radially inwardly applied pressure while a relatively long point 61 formed at the end of a spear member or rod 62 is forced radially outwardly into the upper end of the mushroom stem to impale the latter near its cap.

The rocking action of the cam 52 also assures that the cam follows the moving mushroom stem while maintaining substantially point contact therewith during the holding action. Rubbing or abrading the mushroom stem is thus avoided.

Each of the spear rods 62 is mounted loosely near its inner end 63 in a bearing 64 formed on the underside of the table turret 12. Thus mounted the rod is movable longitudinally and radially outwardly by one or the other of prongs 66, 67 formed at the upper free end of a cam lever 68, the lower end of the lever being pivotally mounted at 69 on the frame 11.

Figure 3:
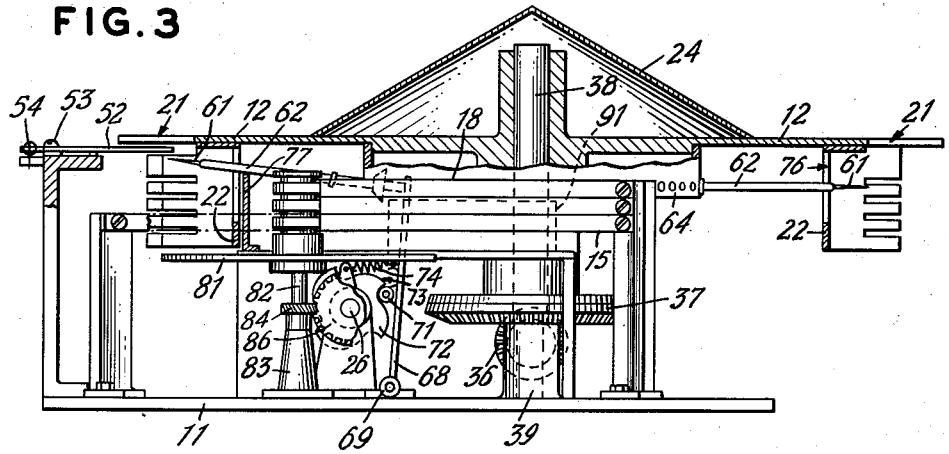
Fig. 3 is a side elevation as viewed from the right side in Figs. 1 and 2.

A cam follower roll 71 is rotatably mounted on the cam lever 68 and engages the periphery of a cam 72. The face 73 of this cam is formed with a series of uniform undulations which act upon the follower roll 71 to oscillate the cam lever 68 in a clockwise direction as viewed in Fig. 3. A spring 74 secured at one end to the cam lever 68 and at the other to the frame 11 biases the cam lever 68 to oscillate in a counterclockwise direction as viewed in Fig. 3, thereby keeping the follower roll 71 in constant engagement with the cam face 73. Cam 72 is keyed to and therefore rotates with shaft 26.

As a mushroom leaves engagement with the cam face 51, it is still securely impaled upon the spear point 61, and it is also held in the locator 22. Thus impaled and held, the advancing mushroom engages the stationary decapping knife 13 (Figs. 1 and 6) and the cap is thereby severed at a plane above the impaling point 61.

Each spear rod 62, near its point 61, passes through a vertical guiding slot 76 formed in the inner end or rear portion of its locator 22. This slot permits the rod to oscillate vertically with its bearing 64 as a center.

Spaced a short distance inwardly from the slotted inner end of the locator 22, an arcuate cam 77, disposed concentrically relative to the shaft 38, is fixed on the frame 11. Each of the spear rods 62 engages the upper cam surface 78 of cam 77 and, as the rod advances, it is raised by the cam to its uppermost position at which it impales the stem of a mushroom, as described above.

As soon as the mushroom is decapped, the cam face 78 is so formed as to control descent of the rod and its impaled mushroom stem until the root end of the stem engages the upper surface of a constantly revolving horizontally disposed disc 81. As shown in Fig. 1 this disc rotates in a clockwise direction so that by virtue of the frictional engagement between root end and disc, the lower end of the mushroom is moved radially inwardly relative to the turret 12 and, simultaneously, the spear rod is projected further outwardly to push the stem outwardly and free of the locator 22. This latter movement of the rod is effected by engagement of the prong 67 of the cam lever 68 which engages the innermost end of the rod. These actions on the stem relocate the latter in its locator 22 preliminary to the stem trimming and cutting operation.

The disc 81 is keyed to a vertical shaft 82 journaled in a pedestal bearing 83 of the frame 11. Rotation of the disc 81 is effected through a spiral gear 84 keyed to the shaft 82 and meshing with a second spiral gear 86 keyed to the drive shaft 26.

When the stem is thus relocated in the locator 22, it engages the stationary knives 15, 16, 17 and 18 which sever the stem into several longitudinal cuts or pieces, the lowermost of which is the root end of the stem which is severed from the stem by the knife 15, and may then fall into or be collected in any suitable place of deposit. The remaining cuts of each stem are carried along the horizontal spaces or tiers above the stationary knives 15, 16, 17, 18 and may thus be advanced by the locator 22 to any suitable discharge point or place of deposit, horizontal slots 88 in the locator permitting it to pass freely along and over the knives. As the knives begin to cut the stem, the spear point 61 is withdrawn from the stem by cooperation of a stationary arcuate cam 91, secured to the frame 11, with disc 92 fixed on the spear rod 62. A collar 93, also secured on the rod, serves as a stop to prevent excessive rearward movement of the rod.

Figure 8:
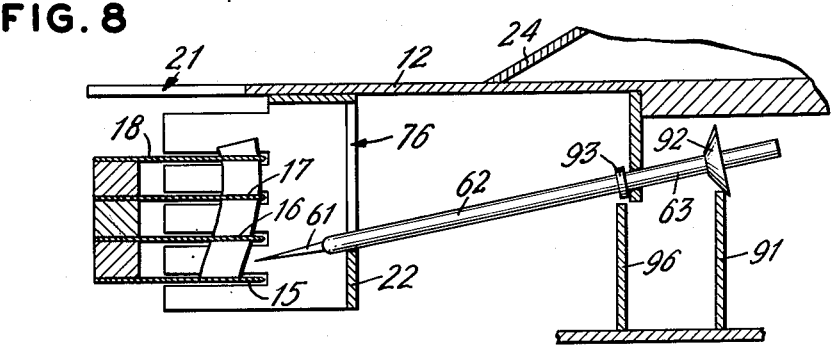

When the point 61 is fully withdrawn from the stem, the rod 62 drops by gravity to the bottom of slot 76, and comes to rest in the position shown in Fig. 8. The point 61 will remain in this lower position until the rod again engages the cam surface 78 of the stationary cam 77 which raises it to its highest position just prior to the next forward movement of the rod 62 to impale another mushroom on the point 61.

Because of the close horizontal spacing between the inner ends 63 of the rods 62, an additional cam 96, similar to and spaced radially outwardly from the cam 91, may be utilized to withdraw alternate rods 62 thereby permitting the discs 92 on the alternate rods to be staggered so as not to interfere one with another.

It is thought that the invention and many of its attendant advantages will be understood from the foregoing description, and it will be apparent that various changes may be made in the form, construction, and arrangement of the parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. In a machine for cutting mushrooms and the like, the combination of a horizontally disposed rotating turret, mushroom locator pockets in the periphery of said turret each supporting and advancing a mushroom with its cap resting on the upper surface of said turret, movable support means for temporarily restraining a mushroom from moving out of its locator pocket, a radially and vertically movable spear member mounted on said turret adjacent each of said locator pockets, means for moving said spear member radially outwardly to impale the upper end of said stem while the latter is restrained in its pocket by said movable support, a decapping knife disposed in the path of the upper end of said impaled stem for severing the cap from the advancing mushroom, a horizontally disposed rotating plate below the path of the decapped impaled stem for supporting the root end of the stem when the latter descends after the decapping operation and for urging the root end radially inwardly to readjust the position of the decapped impaled stem in said locator, and a plurality of horizontally disposed knives in the path of the readjusted stem for severing said stem transversely into a plurality of cut sections.

2. In a machine for cutting mushrooms and the like, the combination of a horizontally disposed rotating turret, mushroom locator pockets in the periphery of said turret for supporting and advancing a mushroom with its cap resting on the upper surface of said turret, restraining means for temporarily holding a mushroom radially inwardly in each of said locator pockets, a radially and vertically movable spear member mounted on said turret adjacent each of said locator pockets, means for moving said spear member radially outwardly to impale the upper end of said stem while the latter is held by said restraining means, a decapping knife disposed in the path of the upper end of said impaled stem for severing the cap from the advancing mushroom, a horizontally disposed rotating plate below the path of the decapped impaled stem for supporting the root end of the stem when the stem descends after the decapping operation and for urging the root end radially inwardly to readjust the position of the impaled stem in said locator, means for further advancing said spear member radially outwardly while said root end is moved inwardly by said rotating plate, a plurality of horizontally disposed knives in the path of the readjusted stem for severing said stem transversely into a plurality of cut pieces, and means for retracting said spearing member from said stem.

3. In a machine for cutting mushrooms and the like, the combination of a horizontally disposed rotating turret, mushroom locator pockets in the periphery of said turret for supporting and advancing a mushroom with its cap resting on the upper surface of said turret, yieldable means for moving each mushroom into its locator pocket while following the mushroom for a short distance along its path, restraining means for temporarily holding a mushroom radially inwardly in each of said locator pockets, a radially and vertically movable spear member mounted on said turret adjacent each of said locator pockets, means for moving said spear member radially outwardly to impale the upper end of said stem while the latter is held by said restraining means, a decapping knife disposed in the path of the upper end of said impaled stem for severing the cap from the advancing mushroom, a horizontally disposed rotating plate below the path of the decapped impaled stem for supporting the root end of the stem when the stem descends after the decapping operation and for urging the root end radially inwardly to readjust the position of the impaled stem in said locator, means for further advancing said spear member radially outwardly while said root end is moved inwardly by said rotating plate, a plurality of horizontally disposed knives in the path of the readjusted stem for severing said stem transversely into a plurality of cut pieces, and means for retracting said spearing member from said stem.

4. In a machine for cutting mushrooms and the like, the combination of a moving conveyor having pockets for retaining and advancing mushrooms with the base of each mushroom cap moving in a predetermined plane and with each stem projecting downwardly therefrom, a spear member adjacent each of said pockets and having its spear point directed initially toward the upper end of the mushroom stem in the pocket, said spear member advancing with said conveyor and being axially movable and vertically oscillatable relative to its pocket, means for moving said spear member toward the stem in said pocket to impale the stem near the cap on the spear point, a decapping knife disposed adjacent and substantially parallel to the plane of the base of the mushroom cap for decapping the mushroom impaled on said spear point, means for controlling the vertical oscillation of said spear member, a locating plate below the path of the root end of the mushroom, the root end of the impaled stem of each mushroom falling in controlled descent onto said locating plate after the mushroom is decapped, a series of vertically spaced and substantially horizontally disposed knives above said plate for cutting said stem transversely, means for withdrawing the spear point from the stem, and means for collecting said caps, root ends and other stem cuts separately.

5. In a machine for cutting mushrooms and the like, the combination of a horizontally disposed conveyor, a mushroom locator pocket in said conveyor for supporting and advancing a mushroom with the under side of its cap resting on an upper surface of said conveyor and its stem suspended in said locator pocket, a horizontally disposed and axially movable spear member mounted on said conveyor adjacent said locator pocket and below said upper surface of the conveyor, means for moving said spear member axially and into said locator pocket to impale said stem, means engageable with and following the movement of said suspended mushroom stem for moving said stem into close engagement with said locator pocket and for applying pressure against said stem in opposition to said impaling movement of said spear to assure impalement of said stem on the spear, a decapping knife disposed in the path of the upper end of said impaled stem for severing the cap from the advancing mushroom, means for trimming the root end from said impaled stem, and means for withdrawing and releasing said spear member from said decapped and trimmed stem.

NIELS P. BACH.

REFERENCES CITED

The following references are of record in the file of this patent:

UNITED STATES PATENTS

| Number | Name | Date |
| --- | --- | --- |
| 334,130 | McMillan | Jan. 12, 1886 |
| 1,823,854 | Coons | Sept. 15, 1931 |
| 1,825,629 | Floyd | Sept. 29, 1931 |
| 1,950,718 | Duncan | Mar. 13, 1934 |
| 2,178,920 | Savery | Nov. 7, 1939 |
| 2,286,649 | Rogers | June 16, 1942 |
| 2,494,914 | Urschel et al. | Jan. 17, 1950 |
| 2,526,712 | Thompson | Oct. 24, 1950 |